April 29, 1941.　　　　R. SIMMON　　　　2,239,760
PHOTOGRAPHIC ENLARGER
Filed Feb. 1, 1940　　　　3 Sheets-Sheet 1
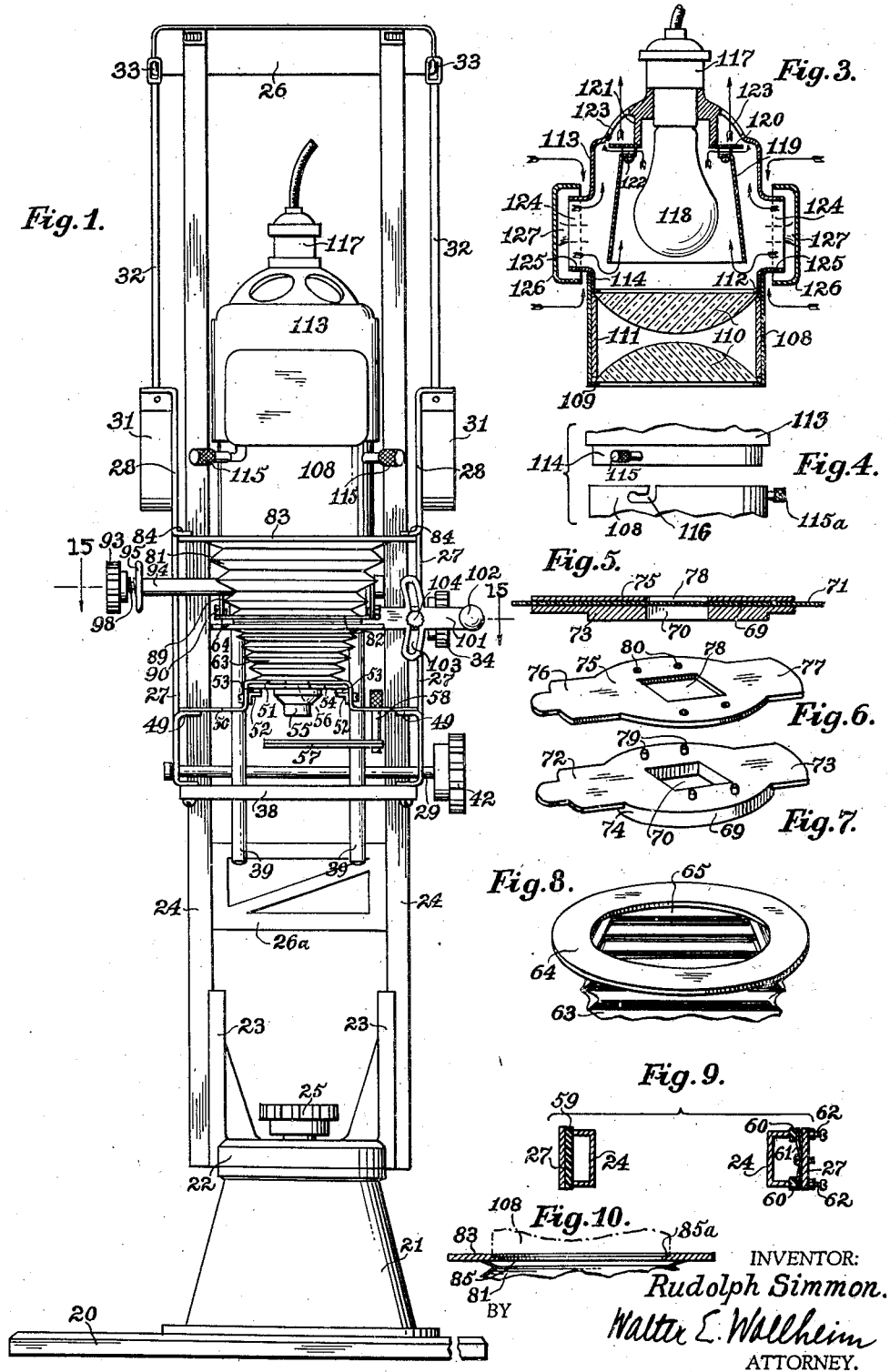
INVENTOR:
Rudolph Simmon.
BY Walter E. Wallheim
ATTORNEY.

April 29, 1941. R. SIMMON 2,239,760
PHOTOGRAPHIC ENLARGER
Filed Feb. 1, 1940 3 Sheets-Sheet 2
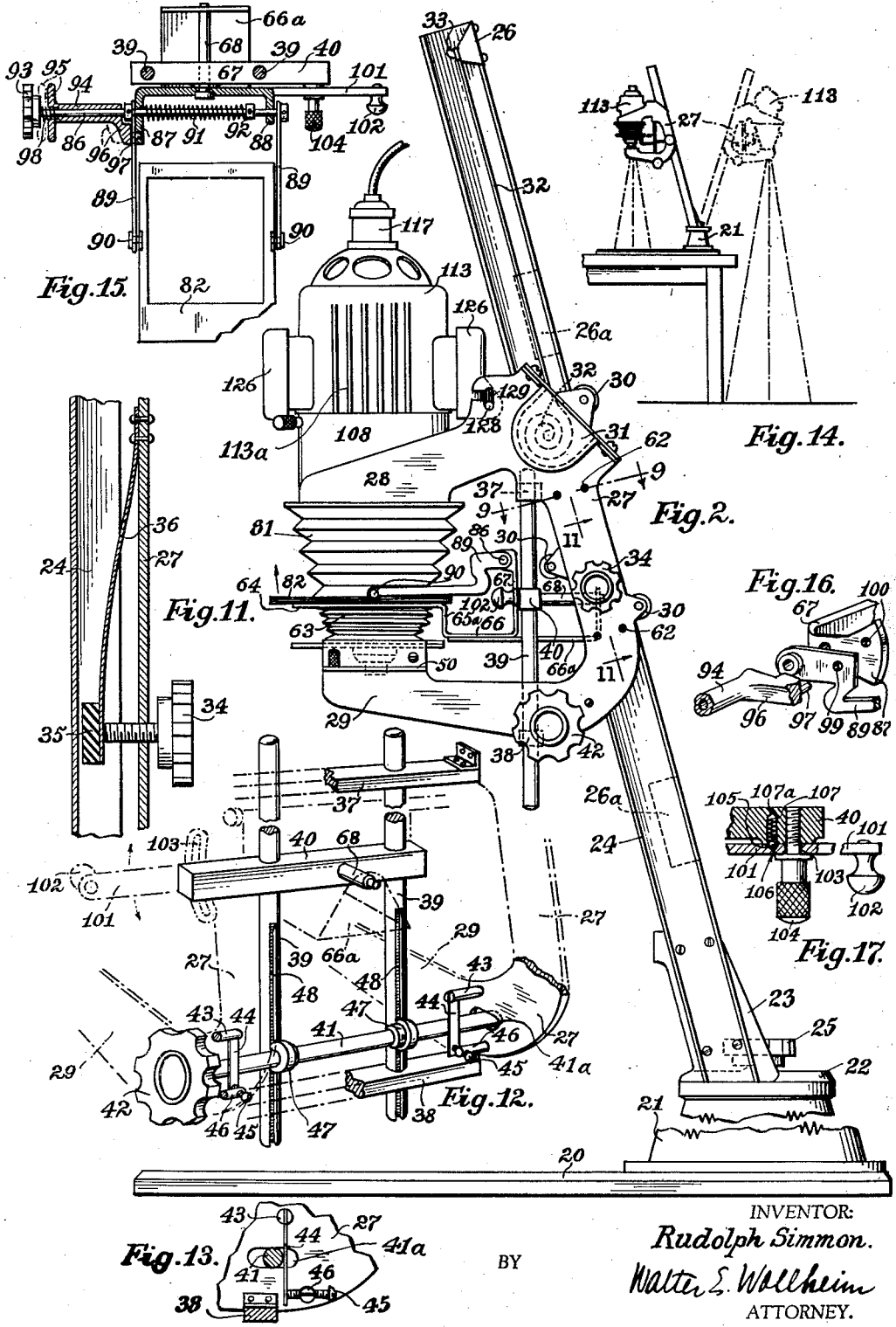
INVENTOR:
Rudolph Simmon.
Walter E. Wallheim
ATTORNEY.

April 29, 1941.  R. SIMMON  2,239,760
PHOTOGRAPHIC ENLARGER
Filed Feb. 1, 1940  3 Sheets-Sheet 3
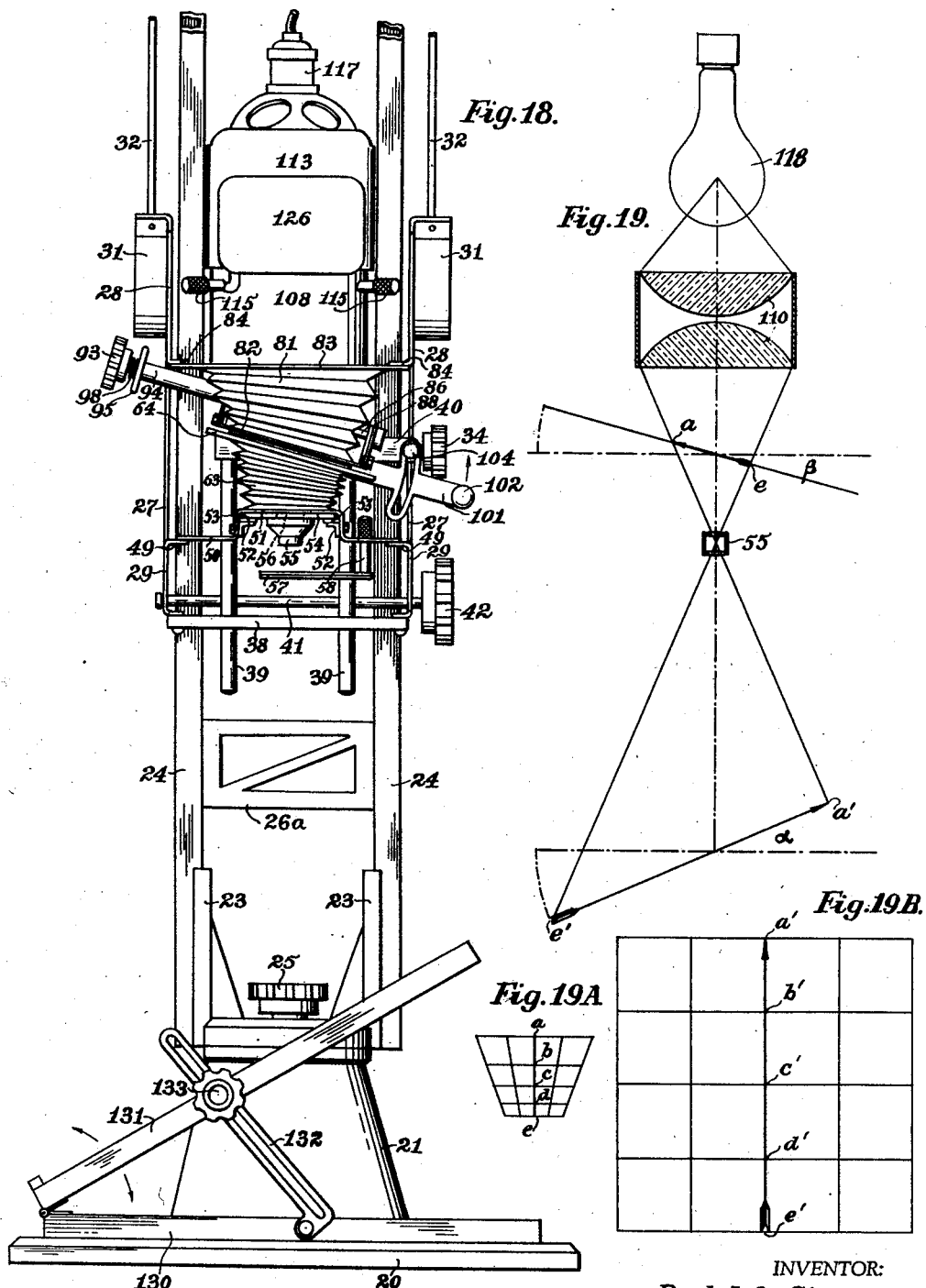
INVENTOR:
Rudolph Simmon.
BY Walter E. Wollheim
ATTORNEY.

Patented Apr. 29, 1941

2,239,760

UNITED STATES PATENT OFFICE 2,239,760

PHOTOGRAPHIC ENLARGER

Rudolph Simmon, Jackson Heights, N. Y., assignor to Simmon Brothers Inc., Long Island City, N. Y., a corporation of New York Application February 1, 1940, Serial No. 316,729

11 Claims. (Cl. 88—24)

An enlarger of photographic negatives consists of a light source, a lens, a condenser interposed between the light and lens, and a negative holder between the condenser and lens. The preferred position of the negative holder in constructions known heretofore was generally fixed and immediately adjacent the condenser. The position of the lens was adjustable to permit accurate focusing. For different focal lengths of enlarging lenses it was necessary to change the condensers which should project an image of the lamp into the optical center of the enlarging lens.

In the enlarger forming the subject matter of this application, I provide a condenser of a size or diameter appreciably larger than the diagonal of the negative. By so doing I can fix the position of the lens at such a distance from the condenser that an image of the light source is projected into the optical center of the enlarging lens which results in maximum efficiency, and I accomplish accurate focusing by adjusting the position of the negative between the condenser and the lens, i. e., adjustment is had by "negative focusing" rather than "lens focusing."

Another object of the invention is to adapt an enlarger for the use of lenses of different focal lengths without change of condensers or their respective positions.

A further object is to provide a supporting frame for the enlarger which is extremely rigid and, by reason of its angular position, effects easy adjustment of the projected picture from the negative upon the sensitized paper resting on the base board or easel.

Another object is to permit rotating of the film or negative holder rather than rotating of the frame of the enlarger or the easel better to adjust the picture;

Still another object is to provide means which permit the rotatable film holder to be tilted to secure in combination with a tiltable easel distortion free prints at full lens openings;

A still further object is to embody in an enlarger of this type, a removable lamp unit with a housing which is ventilated in a very simple and effective manner.

Further objects reside in the structural details of an enlarger made according to the principles of the invention which are designed for simplicity in operation, economy of manufacture, and utmost efficiency.

In the drawings, in which a preferred embodiment of the invention is shown,

Fig. 1 is a front elevational view of an enlarger embodying the principles of the invention;

Fig. 2 is a side elevational view of the same;

Fig. 3 is a longitudinal sectional view of a lamp housing and condenser housing;

Fig. 4 shows exterior fragmentary views of the bottom of the lamp housing and the top of the condenser housing illustrating the means of locking them together;

Fig. 5 is a longitudinal sectional view of a film holder, showing a film in its position;

Fig. 6 is a perspective view of a top plate of the film holder; and

Fig. 7 is a similar view of a bottom plate of the same;

Fig. 8 is a perspective view of a seat for the bottom plate of the film holder;

Fig. 9 is a cross sectional view along the plane of line 9—9 in Fig. 2 showing the frictional contact between the carriage and its support;

Fig. 10 is a fragmentary sectional view through a support plate for the condenser housing;

Fig. 11 is a vertical cross sectional view through a clamping arrangement for the movable carriage of the enlarger to its support, taken along the plane of line 11—11 in Fig. 2;

Fig. 12 is a fragmentary perspective view of details of the focusing adjustment;

Fig. 13 is an elevational view, partly in section of a detail of the parts shown in Fig. 12;

Fig. 14 shows the enlarger mounted upon a table for convenient operation and, in dotted lines, the enlarger in a position in which the film can be projected upon the floor to obtain large sized images;

Fig. 15 is a fragmentary horizontal sectional view along the plane of line 15—15 in Fig. 1, illustrating the locking and release mechanism for the film holder;

Fig. 16 is an exploded view in perspective, on an enlarged scale, of parts shown in Fig. 15;

Fig. 17 is a horizontal sectional view, partly in elevation, also on an enlarged scale, of parts shown in Fig. 15;

Fig. 18 is a front elevational view showing the film holder tilted and in combination with a tilted easel to eliminate distortion in the print;

Fig. 19 is a diagram of the position of the enlarger shown in Fig. 18.

Fig. 19A is a diagrammatic view of a negative in which the image is distorted; and Fig. 19B is the image on the final print as produced by the enlarger positioned as shown in Figs. 18 and 19.

Like characters of reference denote similar parts throughout the several views and the following specification.

20 is a baseboard at one extremity of which is located a pedestal 21 having rotatably fastened upon it a turntable 22 with upturned lugs 23, to each of which girders 24 of substantially U cross sections are secured. A lock screw 25 fastens the turntable 22 to the pedestal 21 in any desired position. Girders 24 are inclined forwardly over the baseboard and have their tops connected by a stringer piece 26. Additional cross pieces 26a are provided between the girders to give the structure additional rigidity. It is obvious that the entire girder assembly can be swiveled upon the pedestal 21 by rotating the turntable 22.

27 are frame members for a focusing carriage at both sides of the girder assembly. Each frame member is substantially U-shaped having an upper leg 28 and a lower leg 29 somewhat inclined toward each other. 30 are rollers secured to the frame members 27 and riding upon opposed end faces of the girders 24 and thus slidingly support the carriage upon the girder assembly. Near the top of each frame member 27 is a housing 31 within which is coiled and fastened upon a suitable shaft a steel spring tape 32, one free end of which projects through the wall of the housing and is fastened to a hook 33 on the stringer piece 26 at the top of the girder assembly, providing a counterbalance for the focusing carriage.

34 is a lock screw at the outside of one of the frame members 27, as also shown more in detail in Fig. 11, and which projects through the member 27 to force a block 35, preferably of Bakelite or other suitable composition, toward the girder 24, the block 35 being fastened by a leaf spring 36 to the members 27, thus traveling with the frame and, when being forced against the girder by the lock screw, effectively clamping the focusing carriage in any desired position.

Slidably supported within plates 37 and 38 across the top and bottom, respectively, of frame members 27, as shown in Fig. 12 and as indicated in dotted lines in Fig. 2, are two parallelly disposed guide rods 39 rigidly connected to a cross bar 40 which carries the negative or film holding mechanism.

41 is a transversely disposed focusing shaft journaled within oblong holes 41a of frame members 27 and near their lowest portions, as shown in Fig. 12 in which parts of the members 27 are shown in dotted lines for sake of clearness. One end of the shaft projects beyond one of the frame members 27 and is provided with a hand wheel 42. From studs 43 in opposed faces of members 27 leaf springs 44 are suspended which are forced against shaft 41 by adjusting screws 45 in studs 46 for the purpose of having wheels 47, keyed to the shaft, frictionally engage the bottom of grooves 48 in the guide rods 39. By turning hand wheel 42, the guide rods 39 are either raised or lowered for focusing purposes, as will be explained more in detail hereafter, by the friction exerted by the wheels 47 against the rods, respectively, their grooves 48.

Upon flanges 49 on top of lower legs 29 of frame members 27 is a bottom plate 50 having a central raised portion 51, on the underside of which are angle plates 52 and springs 53 to removably support a lens board 54 carrying a lens 55 of a construction well known in the art centrally below an aperture 56 in the center of the raised portion 51 of plate 50.

57 is a red filter suspended from a small vertical shaft 58 journaled within the plate 50 adapted to be swung about shaft 58 to a position concentric with the lens.

In Fig. 9 is shown a cross sectional view of the girders only and frame portions of the focusing carriage in section. In this figure a strip 59 of fibre or other suitable material is fastened to the inner side of one of the frame members 27, so as to engage both outer faces of one of the U-shaped girders. At the girder opposite to the one just mentioned, two separate blocks 60 of fibre engage each of the two faces of the girder 27. The blocks 60 are cross connected by a spring 61 centrally fastened to the inner surface of the frame member 27 and are adjustably forced against the girder by means of screws 62. While the assembly just described is located above the plane of hand wheel 34, a similar assembly is located below it, as indicated by the reference numbers 62 for its screws in Fig. 2. By this means loose play between the girder assembly and the focusing carriage is entirely taken up without causing undue frictional resistance, effecting sliding movement of the carriage upon the girders quite easily.

63 are lower bellows fastened with their bottom around opening 56 of plate 50 and with their top to a film holder table 64, having a round central opening 65. The back of the table 64 is bent downwardly at 65a and extends rearwardly at 66 and terminates in an upturned flange 67 pivoted upon a shaft 68 which extends rearwardly from cross bar 40 which connects and to which are rigidly secured guide rods 39. The extreme rearwardly projecting end of shaft 68 is supported by an L-shaped bracket 66a fastened to part 66 of the table.

69 is the bottom plate of a film holder having an opening 70 to correspond to the size of the picture upon a film 71. 72 and 73 are lateral projections from the plate to facilitate its handling. 74 is a round extension at the bottom of plate 69 fitting the round opening 65 of table 64. 75 is a top plate of the film holder having lateral projections 76 and 77 and an aperture 78 to correspond with the projections and aperture of bottom plate 69. Dowels 79 in the bottom plate guide the film 71 and engage holes 80 in the top plate to bring both apertures 70 and 78 in register.

81 are upper bellows, the bottom of which are secured to an apertured pressure plate 82 which compresses the film holder, and the top of which is fastened to support plate 83 connected to inturned flanges 84 of the upper legs 28 of frame members 27. 85 is a round opening through plate 83 having a recess 85a surrounding it, as shown in Fig. 10.

86 is a shaft journaled between inturned flanges 87 and 88 of portion 67 of the table 64. S-shaped levers 89, rigidly connected to shaft 86, are pivotally mounted upon both sides of pressure plate 82 by means of screw studs 90. A retractile coiled spring 91 around shaft 86 fastened to flange 87 at one end and to a bushing 92 secured upon the shaft tends to keep the pressure plate 28 in close contact with the film holder. A hand wheel 93 is fastened to one of the ends of the shaft 86 which projects outside of flange 87. 94 is a trigger slidingly mounted upon the shaft 86 between hand wheel 93 and one of the levers 89, having a finger plate 95, an arm 96 and a pin 97.

A spring 98 around shaft 86 is interposed between the handwheel 93 and the finger plate 95. Hand wheel 93 is turned, until the pin 97 in arm 96 engages through an opening 99, as shown in Fig. 16, a hole 100 in flange 87 which it enters by force of the spring 88. In this position the pressure plate 82 is held off the film holder in which the film can then be changed. Should it be desired to have the pressure plate 82 bear down again upon the film holder, it is only necessary to force the finger plate 95 of the trigger 94 against the hand wheel 93 to disengage the pin 97 from hole 100 in flange 87 when the action of spring 91 forces the levers 89 and thus the plate 82 downwardly against the film holder.

Up-turned flange 67 of the rear extension of the table 64 is extended at one side and below inturned flange 88 at 101 to terminate in a handle knob 102. 103 is an arcuate slot in extension 101 having shaft 68 as its center. 104 is a set screw through slot 103 screwed into the cross bar 40 immediately behind extension 101. By rotating the handle knob 102 and with it extension 101 and the entire pressure plate release mechanism, as well as the film holder, about shaft 68 as an axis, the film holder can be given an angular position, as shown in Fig. 18, which is limited by the extent of the slot 103 and locked in a selected position for purposes more in detail explained hereafter.

105 is a small ball seating against a countersunk spot 106 in the rear of extension 101 adjacent its slot 103. 107 is a spring within a recess 107a in cross bar 40 forcing the ball against its seat when the extension 101 is in an exactly horizontal position, as shown in Fig. 17. When brought to such a position, the ball snaps into its countersunk seat by action of the spring and makes returning the tilting mechanism to its normal or horizontal position a very simple matter.

Fitted into the recess 85a of the support plate 83 is a cylindrical condenser housing 108 having an annular flange 109 secured to its bottom, and a pair of condenser lenses 110 held in definite relation to each other by a spacer 111. 112 is an annular washer upon the top condenser lens.

113 is a substantially cylindrical lamp housing with fins 113a at its outside and having its lower end reduced in diameter at 114 to fit within the top of the condenser housing. A pair of screws 115 in the reduced portion 114 coact with L-shaped slots 116 in the condenser housing to form a lock of the well known bayonet type. Another screw 115a through condenser housing 108 serves, together with screws 115, as handle, and also locks the condenser housing to the lamp housing. 117 is a lamp socket at the top of the lamp housing 113 holding an electric bulb 118 which is preferably made of opal glass centrally within the housing. 119 is a conical baffle around the bulb or lamp connected to an annular flange 120 which is joined to the top of the housing by an inner cylindrical wall 121. Spacers 122 at the top of the baffle permit air to pass between its top and flange 120. 123 are a number of openings through the dome-shaped top wall of the lamp housing. 124 are openings at the front and back of the lamp housing near its bottom having outwardly projecting flanges 125. 126 are hoods over flanges 125 in spaced relation therewith and, preferably, integrally secured to the lamp housing by means of ribs 127. As shown in Fig. 3, by means of opening 123 and 124 air is permitted to circulate through the housing as indicated by arrows which assures a steady flow of cool air past the bulb 118 thus preventing over-heating of the housing as well as of the condenser lenses. The back of the lamp housing 113 has attached to it a horizontally disposed rod 128, either end of which is adapted to rest within substantially T-shaped grooves 129 near the top of each of the frame members 27, serving as a hinge for the housing. By virtue of the T-shaped slots, the hinge rod 128 can readily be slipped out of the slots, and thus the entire lamp housing, as well as the condenser housing connected to it, can quickly be removed from the assembly.

In Fig. 18 an easel is shown resting upon the baseboard 20. The easel consists of a bottom plate 130 having hinged thereto a top plate 131. A slotted lever 132 is pivotally connected to the bottom plate 130. A lock screw 133 fastened to the top plate 131 travels within the slot in the lever and serves to lock the top plate in any desired angular position with respect to the bottom plate.

In the ordinary use of the enlarger, the film is inserted within plates 69 and 75 of the film holder, while the pressure plate 82 is raised by bringing pin 97 in engagement with hole 100 of flange 87. In this position the operator has the free use of both his hands. After the film has been properly placed, pressure plate 82 is allowed to bear down upon the film holder by pressing finger plate 95 against hand wheel 93 and thus release the pin 97 from engagement with the hole in flange 87, as previously explained. With the bulb 118 switched on, the image can be projected upon the easel or the baseboard.

By moving the carriage which contains the lamp, lenses, film and focusing arrangement, up and down the girders 24, the approximate size of the image can be determined, and by tightening the hand wheel 34 the position of the carriage can be fixed accordingly. In order to bring the picture upon the film in sharp focus, I turn hand wheel 42 clock or counterclockwise which in turn raises or lowers the film holder, that is, brings it closer or farther away from the lens. Focusing is thus accomplished by movement of the film with respect to the lens. Inasmuch as the size of the condenser lenses and their respective distances from the lamp and the enlarging lens is so fixed as to project the image of the lamp into the optical center of the enlarging lens, I can use enlarging lenses of different focal lengths with one set of condenser lenses because those distances are not changed during focusing which is accomplished by moving the film holder, that is, focusing is effected by negative (film) focusing.

It is obvious that the inclined position of the girders 24 enables one to project the image upon the baseboard without fouling the girders, because the larger the image, that is, the higher the position of the carriage, the further removed from the girders is the center of the image. The angle of the girders is essentially parallel to the extreme rays emanating from the lens. Should extra large images be desired, the support is simply rotated upon turntable 22 and the image projected upon the floor, as shown in Fig. 14.

The enlarger is especially adapted to correct distortion in negatives. In Fig. 19A is shown diagrammatically, a negative which has been taken while the camera was held obliquely as, for instance, when photographing a tall building. In order to correct this distortion, I project the image from the negative upon the top plate 131 of the easel 130 which has been tilted and locked by screw 133, see Fig. 18. I then focus the negative until the region in the center of the image indicated by line a—e on the negative and line $a^1$—$e^1$ on the image appears sharp. Then screw 104 is loosened and the film holder is turned around shaft 68 in a direction opposite to that of the tilt angle of the easel, see Fig. 19, until the entire area becomes sharp and the divergent lines parallel and the image assumes the aspect of Fig. 19B. In this connection a large angle of the easel necessitates a large angle for the film, but for the same film this angle will become smaller for larger magnifications and vice versa. The sine of angle alpha of the easel equals the sine of angle beta of the negative holder multiplied by the average magnification factor which is measured in the plane of the center of the image. The film holder with the negative may be rotated in order to bring desired lines in the image parallel to its margin, or to compose the picture better within it.

If the negative holder is to be returned to its normal or horizontal position, the handle knob 102 is swung around shaft 68 until the extension 101 is approximately horizontal and moved until ball 105 snaps into recess 106 in which position it is exactly horizontal with respect to the vertical axis of the enlarger.

The lamp housing 113 is well ventilated. Owing to the disposition of the ports 123 and 124 in the housing and the spaces at the top of the baffle 119, a steady stream of cooling air is circulated through the housing in the direction of the arrows, as indicated in Fig. 3. The entire lamp housing unit with the condenser housing can readily be removed from the carriage by simply lifting the ends of rod 128 out of slots 129 in the upper legs 28 of frame members 27. By loosening screws 115 and 115a and giving the condenser housing 108 a slight turn, the condenser housing can easily be disconnected from the lamp housing by clearing the screws 115 through slots 116. The ventilating ports in the lamp housing are either hooded or so disposed that no rays of light can escape through them. Similarly the joints between the lamp and condenser housings and the condenser housing and its support plate 83 are light proof. The cooling of the lamp housing is facilitated by the provision of fins 113a at the outside. The lamp housing and baffle are painted inside as well as outside a dull black on account of its heat repelling characteristics.

The entire carriage is well balanced by means of springs 32 and the minimum of friction obtained with the fiber blocks 59 and 60, as shown in Fig. 9, makes possible moving the carriage with the least effort.

While I have shown bellows between the condensers and enlarging lens, other forms of flexible means may be employed, and the term "bellows" is not to be interpreted narrowly, but where used is to cover any other form of chamber having flexible or self adjusting walls, or may even cover a light-proof housing only over the essential parts of the carriage.

Instead of using a pair of condensers, one, three or more may obviously be used, or in place of a condenser unit, reflective mirrors behind the bulb may be employed.

Where the term "easel" is employed, the same is to denote any convenient form of paper holder or support which may be separate from or integral with the base board.

Moreover, while I have shown two parallel guide rods for the focusing attachment, it is evident that only one guide rod may also be used, or more than two.

It is obvious therefore that many changes of form, proportions and minor details of construction may be resorted to without departing from the principles or sacrificing any of the advantages of the invention as defined in the appended claims.

What I claim as new is:

1. A photographic enlarger comprising a support, a movable carriage thereupon having a light source, a condenser unit, an enlarging lens in fixed relation to said condenser unit, a laterally rotatable negative holder having separable elements to hold the negative between them intermediate said condenser unit and lens, mechanism to vary the distance between said negative holder and, respectively, said condenser unit and lens, means to tilt said holder, and means to clamp said holder elements together.

2. A photographic enlarger comprising a support, a movable carriage thereupon having a light source, a condenser unit, an enlarging lens in fixed relation to said condenser unit, a laterally rotatable negative holder having separable elements to hold the negative between them intermediate said condenser unit and lens, mechanism to vary the distance between said negative holder and, respectively, said condenser unit and lens, means to tilt said holder, and means to clamp said holder elements together, said means to clamp being mounted upon said means to tilt.

3. A photographic enlarger comprising a support, a movable carriage thereupon having a light source, a condenser unit, an enlarging lens in fixed relation to said condenser unit, bellows between said condenser unit and lens, a rotatable negative holder across said bellows having a bottom extension, a seat plate for supporting said holder having a round opening for the reception of said bottom extension, a releasable pressure plate upon said negative holder, a support for said seat and pressure plates, means to tilt said negative holder, seat plate and pressure plate, and mechanism to vary the distance between said negative holder and, respectively, said condenser unit and lens.

4. A focusing carriage for a photographic enlarger consisting of spaced frame members adapted slidingly to engage a support, a lamp housing and a condenser unit at the top of the carriage and supported between said frame members, and an enlarging lens near the bottom of the carriage and between said frame members in fixed relation with said condenser unit, a negative holder intermediate said condenser unit and lens, and mechanism for varying the distance between said negative holder and, respectively, said condenser unit and lens for focusing purposes comprising guide rods slidingly secured to top and bottom parts of said frame members and operatively connected to said negative holder, and means to raise and lower said guide rods.

5. A focusing carriage for a photographic enlarger consisting of spaced frame members adapted slidingly to engage a support, a lamp housing and a condenser housing at the top of the carriage and supported between said frame members, and an enlarging lens near the bottom of the carriage and between said frame members in fixed relation with said condenser unit, a negative holder intermediate said condenser unit and lens, and mechanism for varying the distance between said negative holder and, respectively, said condenser unit and lens for focusing purposes comprising guide rods slidingly secured to top and bottom parts of said frame members and operatively connected to said negative holder, a transversely disposed shaft journaled in oblong slots of said frame members, friction wheels secured to said shaft engaging said guide rods, springs adjustably suspended from said frame members and bearing against said shaft to force said wheels in frictional contact with said guide rods, and manual means to rotate said shaft to raise and lower said guide rods.

6. A focusing carriage for a photographic enlarger consisting of spaced frame members adapted slidingly to engage a support, a lamp housing and a condenser unit at the top of the carriage and supported between said frame members, and an enlarging lens near the bottom of the carriage and between said frame members in fixed relation with said condenser unit, a negative holder intermediate said condenser unit and lens, mechanism for varying the distance between said negative holder and, respectively, said condenser unit and lens for focusing purposes comprising guide rods slidingly secured to top and bottom parts of said frame members, a cross bar rigidly secured to said guide rods, a bottom seat plate and a top pressure plate having said negative holder clamped between them, the said plates being pivotally connected to said cross bar, means to tilt said plates, means to lift and lock said pressure plate off said negative holder, means to automatically return said pressure plate to contact with said holder upon unlocking said pressure plate, and means to raise and lower said guide rods.

7. A photographic enlarger comprising a support, a movable carriage thereupon having a light source, a condenser unit, an enlarging lens in fixed relation to said condenser unit, a laterally rotatable negative holder having separable elements intermediate said condenser unit and lens, mechanism to vary the distance between said negative holder and, respectively, said condenser unit and lens, means to tilt said holder having a resilient member for co-operating with a socket when said holder is in a normal untilted position, and means to clamp said holder elements together, said means to clamp being mounted upon said means to tilt.

8. A focusing carriage for a photographic enlarger consisting of spaced frame members adapted slidingly to engage a support, a lamp housing and a condenser unit at the top of the carriage and supported between said frame members, and an enlarging lens near the bottom of the carriage and between said frame members in fixed relation with said condenser unit, a negative holder intermediate said condenser unit and lens, mechanism for varying the distance between said negative holder and, respectively, said condenser unit and lens for focusing purposes comprising guide rods slidingly secured to top and bottom parts of said frame members, a cross bar rigidly secured to said guide rods, a fulcrum stud projecting from said bar, a seat plate and a pressure plate for said holder connected to said stud, means to tilt said pressure plate, negative holder and seat plate around said stud as a fulcrum, releasable means to raise said pressure plate away from said holder and lock said pressure plate in a raised position, automatic means to return said pressure plate to contact said holder upon releasing said releasable means, and means to raise and lower said guide rods.

9. A focusing carriage for a photographic enlarger having spaced frame members, and a light proof lamp housing of substantially cylindrical shape having a supporting rod horizontally disposed at its outside and supported in and co-operating with open slots in said frame members for ready removal therefrom, air cooling fins at the outside of said housing, a bulb centrally connected to a socket at the top of said housing, a baffle around said bulb having air passages at its top, said housing having air ports at its top, angular walls shielding said ports from rays of light emanating from said bulb, outwardly flanged air ports near its bottom, and cap-shaped hoods over said flanged ports.

10. A focusing carriage for a photographic enlarger having spaced frame members, a light proof lamp housing of substantially cylindrical shape having a supporting rod horizontally disposed at its outside and supported in and co-operating with open slots in said frame members for ready removal therefrom, air cooling fins at the outside of said housing, a bulb centrally connected to a socket at the top of said housing, a baffle around said bulb having air passage at its top, said housing having air ports at its top, angular walls shielding said ports from rays of light emanating from said bulb, outwardly flanged air ports near its bottom, and cap-shaped hoods over said flanged ports, and a condenser unit fitted over the cylindrical bottom of said housing having L-shaped slots, and screws engaging said slots, for locking purposes.

11. A focusing carriage for a photographic enlarger consisting of spaced frame members adapted slidingly to engage a support, a lamp housing and a condenser unit at the top of the carriage, an apertured top table across said frame members for the reception and support of said condenser unit, upper bellows fastened with their top to said table, an apertured top pressure plate fastened to the bottom of said bellows, an apertured bottom table across said frame members, in fixed relation to said top table, a removable enlarging lens in said bottom table, lower bellows having their bottom fastened to said bottom table, a bottom seat plate fastened to the top of said lower bellows, a negative holder clamped between said pressure and seat plates, means to vary the distance between said negative holder and, respectively, said condenser unit and lens, and means to tilt said holder.

RUDOLPH SIMMON.